June 21, 1927.  W. M. BROWER  1,633,516
MULTIPLE VARIABLE CONDENSER
Filed Jan. 17, 1927  2 Sheets-Sheet 1
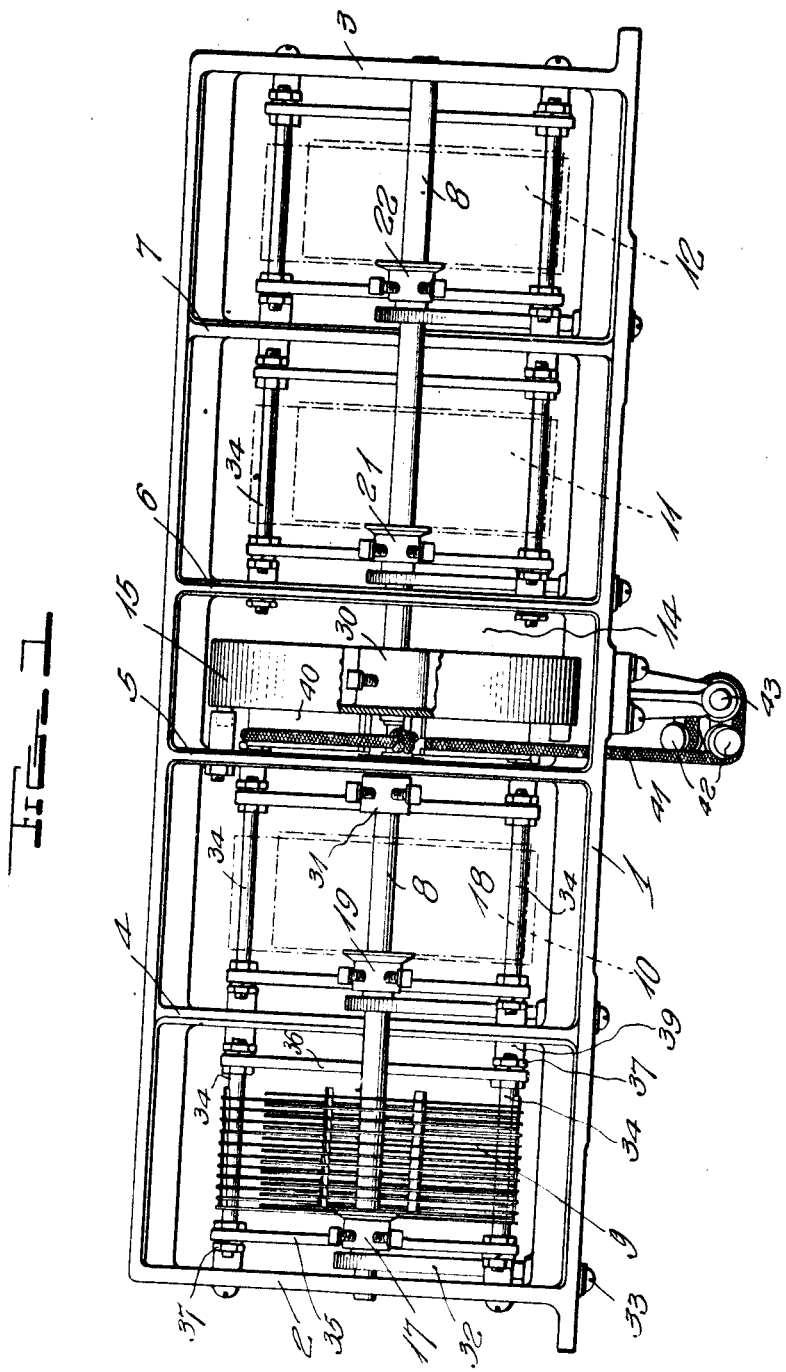
INVENTOR.
William M. Brower,
BY John B. Brody
ATTORNEY June 21, 1927.
W. M. BROWER
1,633,516
MULTIPLE VARIABLE CONDENSER
Filed Jan. 17, 1927
2 Sheets-Sheet 2
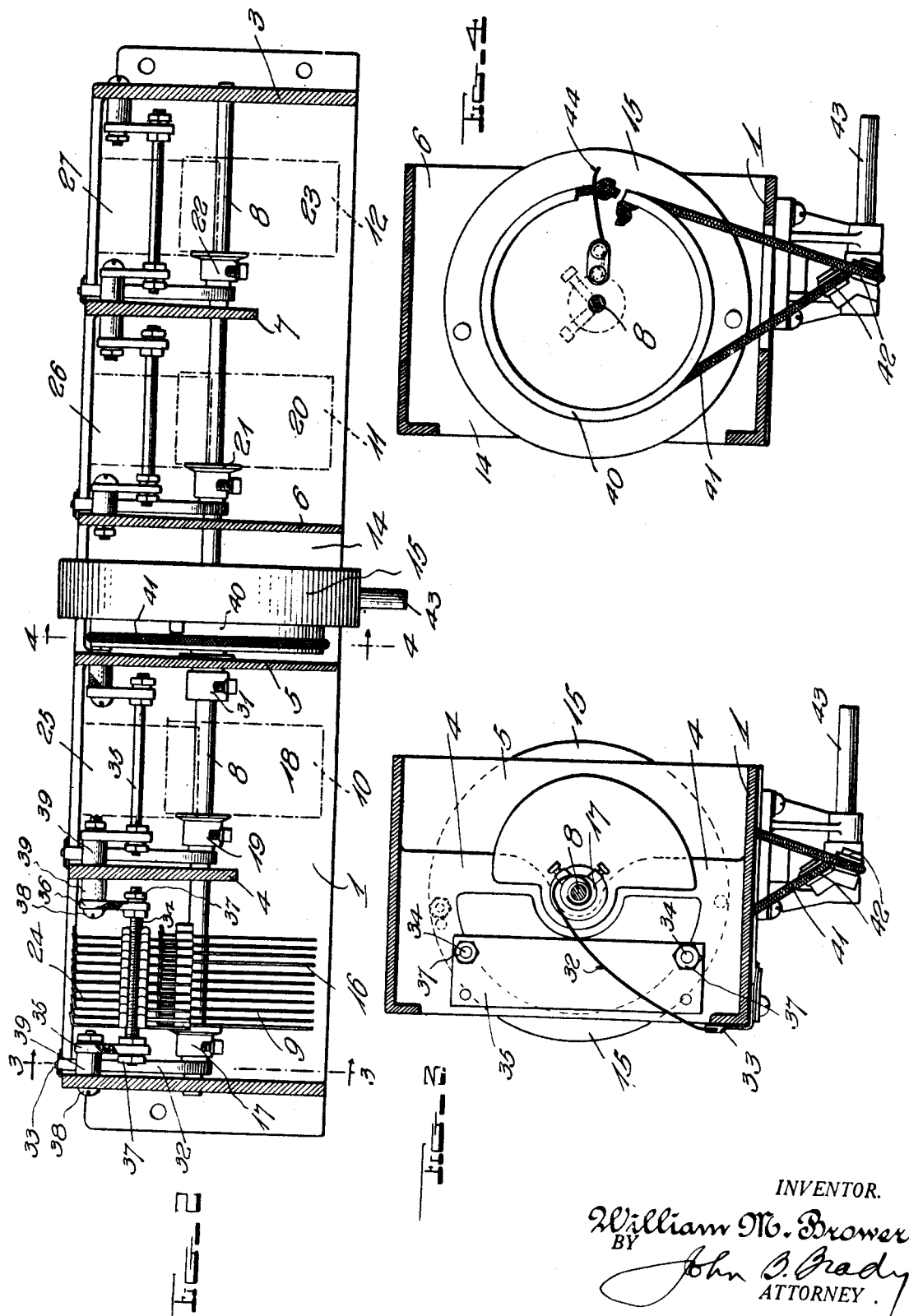
INVENTOR.
William M. Brower,
BY John B. Grady
ATTORNEY.

Patented June 21, 1927.

1,633,516

UNITED STATES PATENT OFFICE.

WILLIAM M. BROWER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA.

MULTIPLE VARIABLE CONDENSER.

Application filed January 17, 1927. Serial No. 161,665.

My invention relates broadly to tuning apparatus and more particularly to a system of variable condensers for controlling the adjustment of a plurality of electrical circuits simultaneously.

One of the objects of my invention is to provide a system of tuning condensers wherein individual condensers are insulatingly supported from a chassis which forms an electrostatic shield for the several condensers and provides a rigid support for the mounting of the condensers.

Another object of my invention is to provide a construction of multiple variable condenser mounted within a main chassis in which the stator plates of individual condenser units are insulatingly mounted on the partition walls of a chassis, while the rotor plates are carried by a shaft journaled in the partition walls of the chassis for simultaneously controlling the movement of the sets of rotor plates with respect to the sets of stator plates.

A further object of my invention is to provide a construction of integral housing for a plurality of independent condensers with means for insulatingly supporting independent sets of rotor plates in space relationship to the walls of the housing while the rotor plates are mounted for movement with respect to the stator plates under control of a central drum positioned within the condenser housing.

A still further object of my invention is to provide a construction of multiple variable condenser in which a chassis is arranged for housing independent sets of variable condensers, where the sets are disposed in electrostatically shielded portions of the chassis, and the stator plates mounted on insulation means connected with the walls of the chassis.

A still further object of my invention is to provide a construction of chassis for a multiple variable condenser divided into a plurality of individual portions each arranged for housing an individual variable condenser with a rotatable shaft member extending through the chassis and provided with a rotatable drum operative within a central portion of the chassis for indicating the rotative movement of the longitudinally extending condenser shaft.

My invention will be more clearly understood by reference to the following specification and the accompanying drawings wherein:

Fig. 1 is a plan view with a part of the indicating drum broken away and shown in cross-section; Fig. 2 is a cross-sectional view taken through the chassis of the variable condenser system of my invention; Fig. 3 is a cross-sectional view taken through the chassis on line 3—3 of Fig. 2; and Fig. 4 is an end view of the rotary indicating drum taken on line 4—4 of Fig. 2.

Heretofore in multiple condenser construction difficulty has been experienced in the manufacture and assembly of multiple variable condensers. The construction of multiple condensers which I have developed is particularly adapted for quantity production where it is essential that assembly time and costs be maintained at a minimum. I provide a construction of chassis which may be cast or placed with a plurality of laterally extending webs forming partition walls laterally along the chassis and establishing a plurality of electrostatically shielded casings in which individual variable condenser units may be mounted. The partition walls are so formed that they provide bearings for a longitudinally extending shaft in the condenser chassis, which shaft carries the sets of rotor plates for cooperation with the sets of stator plates. The sets of stator plates are mounted on insulated end members which are in turn mechanically connected with the end walls of the chassis and with the partition walls. The particular method of mounting the stator elements permits assembly of the apparatus on a quantity production basis by a process of moving the chassis into position with respect to the assembled stator and rotor plates where bolt members may be passed through the insulated supporting means of each of the sets of stator plates and secured to the partition walls for firmly anchoring the sets of stator plates into position.

Referring to the drawings in detail, reference character 1 represents the condenser chassis or cradle having end portions 2 and 3 with interconnected webs or partition walls 4, 5, 6 and 7 disposed laterally along the frame of the condenser. The partition walls form electrostatically shielded enclosures for each of the sets of rotor and stator plates.

I have represented the sets of rotor and stator plates in assembled position at 9, 10, 11 and 12. The chassis is divided into two portions by a central or intermediate portion 14 in which the rotary indicator drum 15 may operate. A rotatable shaft member 8 is journaled in the condenser chassis in bearings formed in the end walls 2 and 3 and partition walls 4, 5, 6 and 7, and to this shaft 8 the rotary indicating drum 15 is keyed by means of a set screw passing through hub member 30. The sets of rotor plates have been represented more particularly in Fig. 2 at 9, 18, 20 and 23. These rotor plates are supported on carriers or hub members 17, 19, 21 and 221, respectively, each of which are keyed to the rotatable shaft 8 in a selected position by means of a set screw. In order to maintain the shaft 8 in a selected position a stop member 31 is secured upon the shaft 8 adjacent the partition wall 5 for locating the shaft with respect to the condenser chassis. Adjacent each wall and attached to the shaft 8 I provide a spiral connecting member 32 which connects to a terminal 33 carried by the chassis 1 and to which electrical connection can be made to the electron tube system in which the multiple condenser is connected thereby establishing a good electrical connection direct with each set of rotor plates. The sets of stator plates as shown at 24, 25, 26 and 27 are located between the walls comprising the several sections of the chassis by means of an assembly which includes screw members 34 which form supporting posts for the stator plates and insulation means 35 and 36. The insulation means 35 and 36 are in the form of rectangular strips apertured adjacent each corner thereof. Each set of stator plates has a screw member 34 located at opposite ends thereof, and these screw members project through the apertures in insulated plates 35 and 36 and are secured therein by means of nuts 37. The insulated strips 35 and 36 are mounted between the walls by means of bolt members 39 with insulated bushings thereon. In the case of the condensers assembled on opposite sides of the walls 4 and 7 a bolt member passes through both strips of insulation and through each of the insulated bushings rigidly mounting the insulation strip members in spacial relation to the condenser chassis. The assembly of the insulation strips upon the bolt members 38 is such that the several sets of condensers may be moved into the chassis and the condensers rapidly bolted into place in spacial relation to the several walls of the chassis. The rotary indicating drum which is operative in the portion 14 of the chassis is provided with a grooved pulley drum 40 around which drive cord 41 passes, the drive cord being directed over guide pulley members 42, the movement of which is controlled from shaft 43. The drive cord 41 is subjected to tension by means of a spring device 44 preventing slippage in the drive connection.

The embodiment of my invention illustrated in the drawings has been found to be very practical in manufacture and production, though I desire that it be understood that modifications may be made and that no limitations upon my invention are intended other than are imposed by the scope of the appended claims.

What I claim as new and desire to secure by Letters Patent of the United States is as follows:

1. A multiple variable condenser comprising a chassis constituted by an integral substantially rectangular housing, a plurality of integral web members disposed in said housing at points spaced along said chassis providing compartments electrostatically isolated one from another, a variable condenser including stator and rotor plates disposed in each of said compartments, said stator plates being insulatingly suspended from the web members of said compartments, a shaft member passing through said chassis and journaled in the walls of said compartments for carrying said sets of rotor plates, whereby said sets of rotor plates may be variably interleaved with said sets of stator plates.

2. A multiple variable condenser comprising a chassis constituted by an integral metallic housing having laterally extending web portions at spaced intervals along the length thereof and forming electrostatically shielded compartments, variable condenser units located within said compartments, each of said variable condenser units having rotor and stator plates, said stator plates being provided with insulated end portions extending substantially parallel to the web portions of said compartments and connections between said insulated strip members and the walls of said compartments.

3. A multiple variable condenser comprising a chassis constituted by a substantially rectangular housing having laterally extending partition walls disposed at spaced intervals along the length thereof, and providing compartments within said housing, a rotatable shaft member passing longitudinally through said chassis and journaled in said walls, variable condensers located in each of said compartments, said condensers being constituted by sets of rotor and stator plates, said sets of stator plates each having posts extending on opposite sides thereof, insulating strip members mounted from said partition walls in planes parallel thereto, and connections between said insulating strip members and said posts for suspending said stator plates in spaced relation within each of said compartments in a position in which said sets of rotor plates carried by said shaft may be variably interleaved therewith.

4. A multiple variable condenser comprising a chassis constituted by a housing having a plurality of integrally connected laterally extending portions at spaced intervals along the length thereof, a shaft member passing longitudinally through said chassis and journaled in said laterally extending portions, a hub member secured to said shaft member intermediate each of said laterally extending portions, sets of rotor plates carried by each of said hub members, sets of stator plates disposed between said laterally extending portions in a position between which said rotor plates may be variably interleaved, said sets of stator plates each having strips of insulation extending parallel to the surface of said plates, and spacing members connected to said laterally extending portions and to said insulation strips for locating said sets of stator plates between said laterally extending portions.

In testimony whereof I affix my signature.

WILLIAM M. BROWER.